Nov. 7, 1950  V. KLÍMA  2,528,960
SQUIRREL-CAGE ARMATURE OF INDUCTION
MOTOR WITH BRIDGE RESISTANCE
Filed June 2, 1948  4 Sheets-Sheet 1
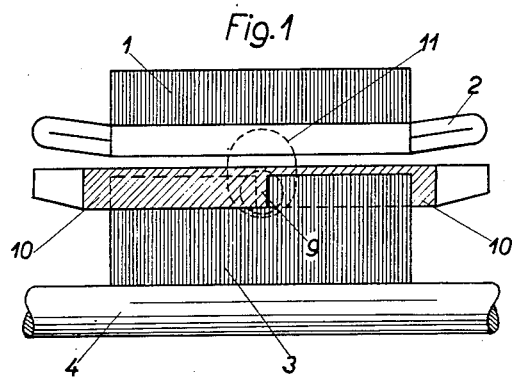
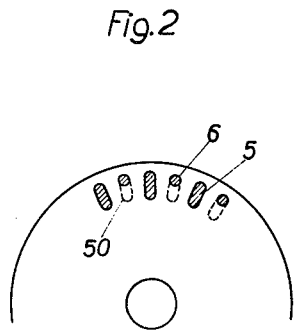
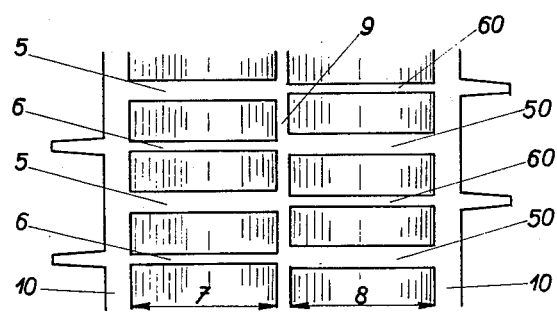
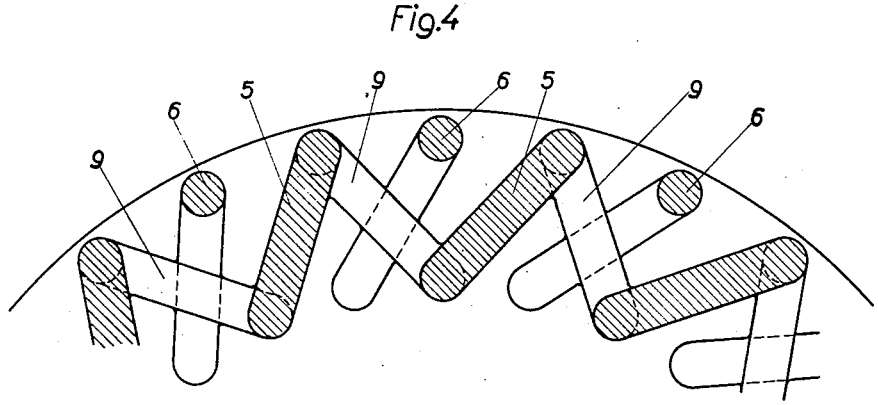
Inventor:
Vilém Klíma,
by

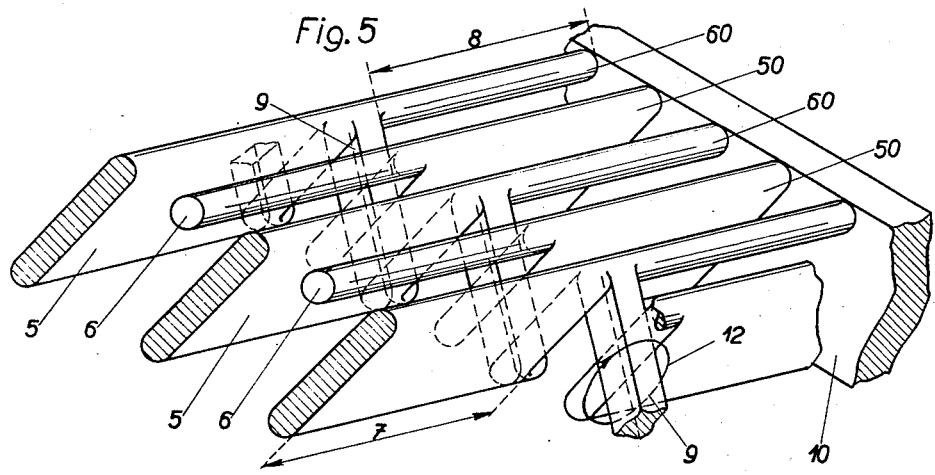
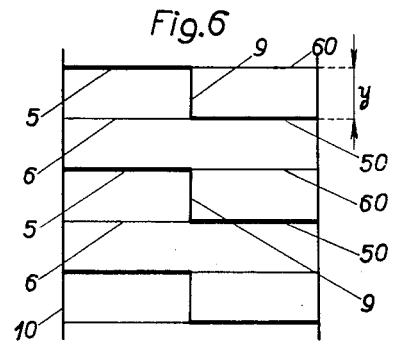
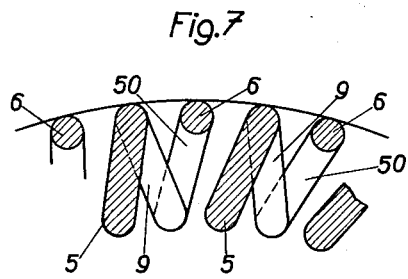
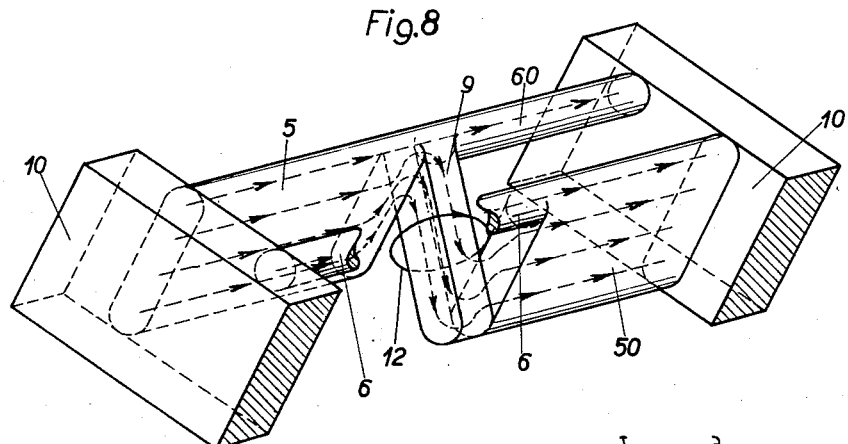

Nov. 7, 1950  V. KLÍMA  2,528,960
SQUIRREL-CAGE ARMATURE OF INDUCTION
MOTOR WITH BRIDGE RESISTANCE
Filed June 2, 1948  4 Sheets-Sheet 3

Inventor:
Vilém Klíma,
by Paul H. [Signature]

Patented Nov. 7, 1950

2,528,960

UNITED STATES PATENT OFFICE 2,528,960

SQUIRREL-CAGE ARMATURE OF INDUCTION MOTOR WITH BRIDGE RESISTANCE

Vilém Klíma, Prague, Czechoslovakia, assignor of one-half to Moravian Electrical Engineering Works, National Corporation, Olomouc, Czechoslovakia Application June 2, 1948, Serial No. 30,567
In Czechoslovakia June 27, 1946

11 Claims. (Cl. 172—120)

This invention relates to squirrel-cage motors and, more particularly, to improved armature constructions for such motors resulting in improved starting qualities.

In the case of a double squirrel-cage, a cage with low resistance and high reactance has a smaller diameter than a cage with high resistance and low reactance. This weakens the teeth considerably, their saturation increases and the magnetising current rises.

It is desirable to maintain the reactance at as low a value as possible for the purpose of improving the power factor of the motor. While numerous proposals have been made for overcoming these disadvantages, none of them have proven thoroughly satisfactory in practice. In accordance with the present invention, these disadvantages are overcome by dividing the armature conductors into serially connected sections of differing cross-sectional areas. Ringlike arrangements are provided for interconnecting the armature conductors at the junctions of the different sections so as to provide brush arrangements for obtaining different current distributions under different conditions. For example, in starting the motor, the relative frequency of the armature current is very high, and the invention arrangement provides a frequency effected current path such that the resistance of the conductors is increased in starting. As the armature speed increases, the relative frequency of the armature current is decreased, and the invention arrangement then provides other low resistance paths for the flow of armature current. Thus, an increased resistance is provided in the armature with a correspondingly low reactance.

It is, accordingly, among the objects of this invention, to provide an improved armature construction for squirrel-cage motors. Another object is to provide a double squirrel-cage motor arrangement having an armature which has a relatively high resistance and low reactance both in starting and running conditions.

These and other objects and novel features of the invention will be apparent from the following description and the accompanying drawings.

In the drawings:

Fig. 1 is an axially sectional view through the motor construction according to the present invention.

Fig. 2 is a diametrically sectional view through the motor armature.

Fig. 3 is a developed view of the motor armature.

Fig. 4 is a partial diametrical view of an armature according to another embodiment of the invention.

Fig. 5 is a perspective view of one form of armature winding according to the invention.

Fig. 6 is a schematic armature development of another embodiment of the invention.

Fig. 7 is a partial diametric sectional view of an armature according to the invention, somewhat similar to the arrangement of Figs. 4 and 5.

Fig. 8 is a perspective view of an armature winding corresponding to Fig. 7.

Figure 9:
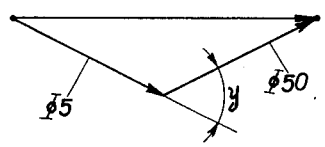
Fig. 9 is a vector diagram of the magnetic fields corresponding to the arrangement of Fig. 6.

Referring first to Figs. 1, 2 and 3, the motor field is indicated at 1 as having field windings 2, and the armature is illustrated as comprising laminations 3 mounted on a shaft 4 in the usual manner. In accordance with the present invention, the slot arrangement of the armature is such that two sets of slots, each of different area, are arranged around the armature, with each slot extending substantially half the length of the armature. Specifically, the slots comprise relatively large area slots such as 5 and 50, and relatively small area slots such as 60. The arrangement is such that each small area slot constitutes a longitudinal continuation of a large area slot and vice versa. Thus, slots 5 are longitudinally aligned with slots 60, and slots 60 and slots 6 are longitudinally aligned with slots 50. This may be effected by punching or otherwise forming alternating wide and narrow slots around the circumferences of the laminations, and forming two groups of laminations, each group having an axial thickness substantially one-half the length of the armature. The two groups are then arranged in staggered relation, the amount of offset being equal to one slot pitch. Thereby the serially connected large area and small area slot sections are provided.

The conductor arrangement comprises end connectors 10 extending circumferentially of the armature and intermediate connector ring 9. Each end ring 10 is connected to ring 9 by alternately arranged large area conductor bars 5 and small area conductor bars 6 in one-half of the armature, and by small area conductor bars 60 and large area conductor bars 50 in the other half of the armature winding. The conductor arrangement may thus set into the slot sections in such manner that the conductor bars of large cross-sectional area fit into the large area slots and the conductor bars of small cross-sectional area fit into the small area slots. The described arrangement, according to the invention, acts as follows: When switching on the current with the rotor stationary, i. e. with a high frequency in it, the considerable reactance of ring 9 forming a bridge between the adjacent slots 5 and 50, prevents the current from passing between them, so that the current flows, almost exclusively, from 5 into 60, and from 6 into 50. In this way the required increase of resistance in the rotor is obtained, because the resistance of rods 6 and 60 is higher than the resistance of rods 5 and 50, and the rotor acts as if resistances 5 and 60, or 6 and 50 respectively, were connected in series. When the motor is running the frequency in the rotor is low and, therefore, the current may flow from 5 either into the prolongation 60 or mainly into the two adjacent slots 50. The rod groups 5, 50 and 6, 60 act, therefore, as if connected in parallel, and the rotor acts as a series connection of groups 5 and 6 with groups 50, 60 which provides a considerably lower resistance in the armature than during starting up, provided the sections of 5 and 6 are suitably chosen. The advantage of the described arrangement is that neither slots 5 nor 6, or 50, 60 resp., have to be deep so that the rotor teeth are not weakened. Leakage flux 11 of bridge (ring) 9 passes through the air gap like the leakage flux of the conductors.

Fig. 4 illustrates an alternative arrangement especially suited for die-cast rotors. The slots are deeper and have a larger cross-sectional area than slot 6. Additionally, they are inclined relative to the radii of the rotor. The bridge 9 is formed by arranging several laminations in such a manner that the sections of their slots form a mirror image to the sections of the slots in one armature half section. The other armature half section is angularly displaced with respect to the first armature half section so that the longitudinal axis of slots 60 are identical with those of slots 5 and those of slots 50 are identical with those of slots 6.

Fig. 5 illustrates the conductor arrangement which may be formed by casting in the armature slots, one of the conductor rings 10 being omitted for simplicity. While this arrangement has the same electrical qualities as the arrangement of Figs. 1 through 3, its manufacture is simpler as it requires only one kind of punching and a smaller slot depth. Inclination of bridge 9 causes its leakage flux to pass through the air gap as well as the rotor. This flux, which is designated 12 in Fig. 5, passes partially in a direction perpendicular to the rotor laminations and overcomes the insulation resistance between the laminations but does not overcome the air gap resistance.

The reactance value of bridge 9 may be controlled by the number of slots. The current in the bridge is approximately inversely proportional to the number of slots. By increasing the number of slots the current in rods 5 decreases and hence also the current in bridge 9.

Fig. 6 illustrates an arrangement by means of which the reactance of bridge 9 may be increased. In this arrangement, bridges 9 do not form a continuous ring, but only connect two adjacent bars 5 and 6 or 50 and 60.

An arrangement similar to that shown in Figs. 4 and 5 but with inclined slots, is shown in Figs. 7 and 8. In this arrangement bridge 9 carries approximately twice the current of the arrangements shown in Figs. 1 through 5. The magnetic energy of the flux leakage fields around the bridge is approximately double. Owing to the doubling of the current it would normally be four times as large but the length of the bridge arrangement has been cut in half.

Compared with winding arrangements such as shown in Figs. 1 through 5 with the bridges forming a continuous ring, windings such as shown in Fig. 6 have an additional leakage field due to the bridges 9 not forming a continuous ring and connecting conductors 5 and 50 in series. These conductors then form windings having a pitch $y$. The increase in the leakage field can be demonstrated from the following consideration.

Assuming that the resistance of conductors 6 and 60 is high as compared with the resistance of conductors 5 and 50 and that the motor runs almost synchronously so that the frequency of the current in the armature is very low indeed, the current will pass from ring 10, through conductors 5, bridges 9 and conductors 50, into the other ring 10. Conductors 5 will form a rotating field $\Phi 5$ and conductors 50 a rotating field $\Phi 50$. These fields are equally strong and shifted against each other by $y$ electrical degrees given by skewing conductors 5 about conductors 50. The resulting field $\Phi 5 \div \Phi 50$ acting upon the stator is the geometrical sum of both fluxes as indicated in Fig. 9. With a given stator current, and hence a definite current in rings 10 the current in conductors 5 and 50 must necessarily be higher than it would be in the case of $y=0$.

Figure 11:
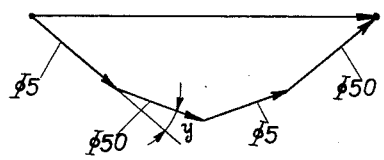
Fig. 11 is a vector diagram of the field fluxes corresponding to the arrangement of Fig. 10.

This reactance may be further increased by decreasing the number of slots, because the magnetic energy (reactance) is inversely proportional to the square of the number of slots per pole, which follows from the relation that it is directly proportional to the square of the current. This increase of reactance may be effected by the arrangement shown in Fig. 10 in which the arrangement of Figs. 6, 7 and 8 is repeated several times. Thus, in Fig. 10, one conductor may comprise a bar 5 in series with a bar 60 in series, with another bar 5 in series with another bar 60. This arrangement provides a reactance which is sufficient for normal working conditions with the rotor current being only slightly increased. The vector arrangement of the flux is indicated in Fig. 11.

Figure 12:
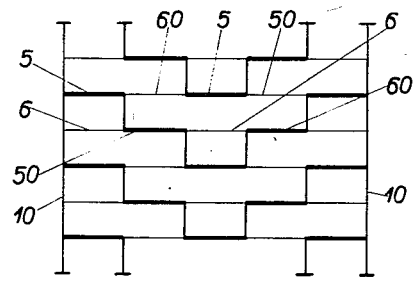
Figs. 12 through 15 are schematic developed views of armature constructions according to further embodiments of the invention.
Figure 10:
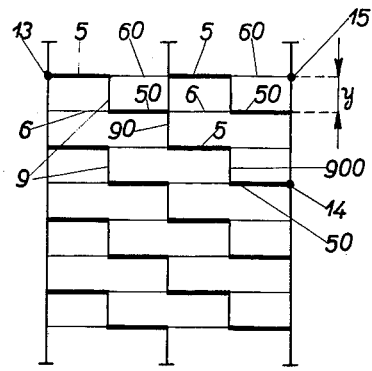
Fig. 10 is a schematic developed view of an armature according to a further modification of the invention.

The alternative arrangement shown in Fig. 12 has an advantage, as compared with that of Fig. 10, of a more favorable distribution of the induction in the air gap in an axial direction and an elimination of axial forces. Furthermore, the large number of individual sectors into which the rotor is divided in an axial direction provides for an easier transfer of heat from the small section conductors to the large section conductors.

Figure 13:
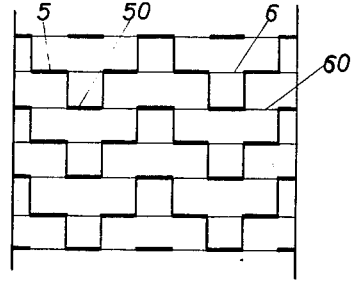

The arrangement of Fig. 13 results in even more divisions in the axial direction and, at the same time, an equal number of strong and weak conductors in each slot which enables an even spreading of the magnetic flux in the rotor teeth.

Furthermore, the arrangement of a motor with bridges 9 not forming a continuous ring has a quality unobtainable by a double squirrel-cage armature. Namely, in the case of a double squirrel-cage armature, the slip-current performance characteristic is a curve of the fourth order, whereas in the case of an armature constructed according to the invention it is a curve of at least fifth order. Hence, it is possible, by a suitable design, to eliminate the frequently occurring dip in the moment characteristic of double squirrel-cage motors.

Figure 14:
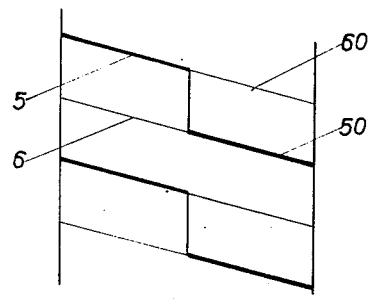
Figure 15:
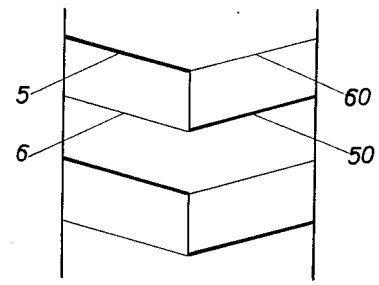
Figure 16:
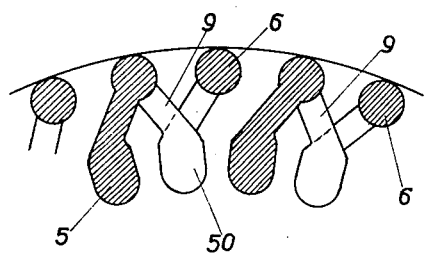
Figs. 16 and 17 are partial diametric sectional views of armatures according to the invention.

In all of the foregoing alternative arrangements, it is possible to skew the slots so that they run at an angle to the rotor axis. Such arrangement is shown in Fig. 14 as applied at conductor and slot arrangement of Fig. 6. An alternative V arrangement is shown in Fig. 15. Fig. 16 illustrates how the invention arrangement may be utilized with existing double square-cage motors, and conductors 5 and 50 may also be made with a small section upper part so that increase of their resistance may also add to the increase in the total armature resistance during the starting.

Figure 17:
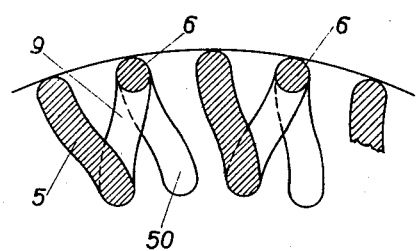
Figure 18:
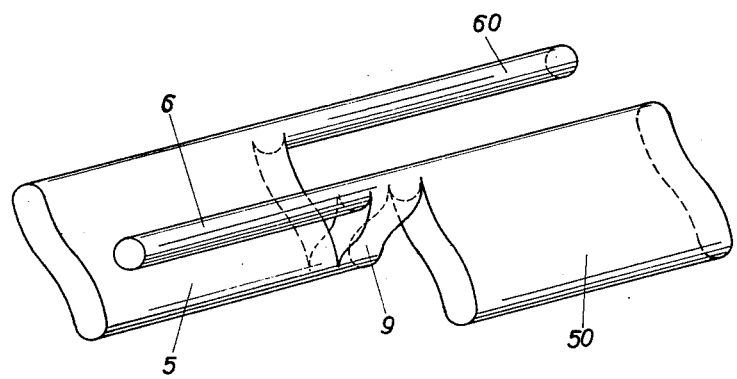
Fig. 18 is a perspective view of an armature conductor corresponding to Fig. 17.

Figs. 17 and 18 illustrate an arrangement for a skin effect armature. Conductors 5 are narrow and deep and in order to enable the current to pass without high resistance, at small slips, from conductors 5 into conductors 50, the combined sections of conductors 5 and 50, are formed to assemble a letter S in end elevation.

The described rotor arrangements provide for increased resistance and decreased ractance during starting of the motor and have a decreased resistance when the motor is running.

While specific embodiments of the invention have been shown and described in detail to illustrate the application of the invention principles, it will be understood that the invention may be otherwise embodied without departing from such principles.

I claim:

1. In an A. C. squirrel-cage motor, a rotor having circumferentially spaced peripheral slots extending generally longitudinally along its outer surface and in substantially parallel relation to each other, each slot including small and large cross-section area portions arranged in longitudinal alternation along the slot and the large cross-section area slot portions being alternated with the small cross-section area slot portions circumferentially of the rotor; a winding including circumferentially spaced, generally longitudinally extending conductors each including longitudinally alternating large and small area conductor sections arranged in and substantially filling said slot portions; and circumferentially extending, axially intermediate, bridge members each connecting an end of a large area section of one conductor to an end of a large area section of a circumferentially adjacent conductor.

2. In an A. C. squirrel-cage motor, a rotor having circumferentially spaced peripheral slots extending generally longitudinally along its outer surface and in substantially parallel relation to each other, each slot including small and large cross-section area portions arranged in longitudinal alternation along the slot and the large cross-section area slot portions being alternated with the small cross-section area slot portions circumferentially of the rotor; a winding including circumferentially spaced, generally longitudinally extending conductors each including longitudinally alternating large and small area conductor sections arranged in and substantially filling said slot portions; circumferentially extending axially intermediate, bridge members each connecting an end of a large area section of one conductor to an end of a large area section of a circumferentially adjacent conductor; and bridge elements interconnecting the ends of said conductors.

3. A motor as claimed in claim 2 in which said bridge members are continuous and interconnect all of said conductors.

4. A motor as claimed in claim 2 in which said bridge members are discontinuous.

5. A motor as claimed in claim 2 in which each slot includes more than one of each type of slot portion, and each conductor includes more than one of each type of conductor segments.

6. A motor as claimed in claim 2 in which each slot includes more than one of each type of slot portion, each conductor includes more than one of each type of conductor segments and said bridge members interconnect one end of a large area conductor section to the adjacent end of the large area section of the next slot, connect the other end of said large area section of the next slot to the adjacent end of a large area section of the following slot, and so forth.

7. A motor as claimed in claim 2 in which each large area slot portion extends into the rotor at an angle to the corresponding radius thereof.

8. A motor as claimed in claim 2 in which said slots extend at an angle to a rotor surface element parallel to the rotor axis.

9. A motor as claimed in claim 2 in which, in the rotor development, each slot forms a V having its apex at a point midway of the ends of the rotor.

10. A motor as claimed in claim 2 in which each slot includes more than one of each type of slot portion, each conductor includes more than one of each type of conductor segments and said bridge members progressively shift in position by a distance equal to one slot pitch, in the same direction proceeding from one end of the rotor toward the mid-point thereof, and in the opposite direction proceeding from the rotor mid-point toward the opposite end thereof.

11. In an A. C. squirrel-cage motor, a rotor having circumferentially spaced peripheral slots extending generally longitudinally along its outer surface and in substantially parallel relation to each other, each slot including small and large cross-section area portions arranged in longitudinal alternation along the slot and the large cross-section area slot portions being alternated with the small cross-section area slot portions circumferentially of the rotor; said rotor comprising laminations punched to form alternate large area and small area slots around their peripheries, said laminations being stacked to form two rotor sections, and said rotor sections being assembled in angularly offset relation, the angular offset being equal to one slot pitch.

VILÉM KLÍMA.

REFERENCES CITED

The following references are of record in the file of this patent:

FOREIGN PATENTS

| Number | Country | Date |
|--------|---------|------|
| 661,839 | Germany | June 28, 1938 |